Patented May 29, 1951

2,555,127

UNITED STATES PATENT OFFICE 2,555,127

PRODUCTION OF AZINE DYESTUFF IMAGES

Robert C. Gunther, Galesburg, Ill., assignor to General Aniline & Film Corporation, New York, N. Y., a corporation of Delaware No Drawing. Application January 10, 1950, Serial No. 137,879

8 Claims. (Cl. 95—88)

The present invention relates to the production of azine dye images by color forming development by utilizing as the color developer an aromatic diamine containing a primary amino group and as the coupling directing group a phenolic hydroxyl group in para position to said primary amino group and to such color developers.

U. S. Patent No. 2,486,440, granted November 1, 1949, to Willy A. Schmidt and Vsevolod Tulagin, entitled "Production of Phenazonium Dyestuff Images," describes the preparation of azine dye images by color forming development of an exposed silver halide emulsion in the presence of a color former with a color developer which is a triamine of the following general formula:

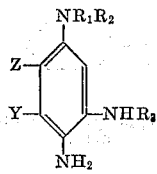

wherein $R_1$ is hydrogen or an aliphatic radical, $R_2$ is hydrogen, an aliphatic or an aromatic radical, $R_3$ is an aliphatic or an aromatic radical, $Z$ and $Y$ are hydrogen, sulfo or carboxy. Such color developers, and particularly those of the metanilic acid class, are quite effective in the formation of azine dye images.

It has been ascertained that the amino group para to the primary amino group in such developers exerts a powerful effect upon the ring closure necessary for the formation of the azine dye from the intermediarily formed quinonimine dye. Thus in application Serial No. 577,134, filed on February 9, 1945, by Willy A. Schmidt and Joseph A. Sprung, now abandoned, a method for forming azine dye images is described in which there is employed as the color former a compound of the following formula:

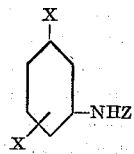

wherein $Y$ is an amino group, $X$ is hydrogen, alkyl or the like, and $Z$ is a radical more electronegative than hydrogen, for instance, $-C_6H_5$, $-SO_2C_6H_5$, $-CN$, $-CO.OR$, and the like.

By reacting during development of an exposed silver halide emulsion such color formers with the oxidation products of a p-phenylenediamine type developer, quinonimine dyes are produced which upon ring closure lead to azine dyes. During such ring closure, the group characterized by radical $Z$ is eliminated.

Efforts were made to produce the azine dye images while utilizing compounds of the above type in which, however, radical $Y$ is phenolic hydroxyl rather than amino. It was found quite surprisingly that with such compounds ring closure could only be effected in those instances where $Z$ was highly electronegative and was represented by the grouping $-SO_2R$, $R$ being alkyl or aryl.

It was to be assumed from this that the phenolic hydroxyl group does not have such ability to force ring closure as would permit the employment in the azine process of U. S. P. 2,486,440 of color developers of the type indicated wherein, however, the amino group para to the primary amino group is phenolic hydroxyl. Thus the experience gained in connection with the work described in U. S. application Serial No. 577,134 would give rise to the inevitable conclusion that the phenolic hydroxyl group if present in compounds of the type referred to in the aforesaid patent would not be suitable to cause the intermediarily formed quinonimine dyes to convert to the azine dyes.

It has now been discovered surprisingly, however, that phenols of the above type are in fact suitable for the azine synthesis despite the recognized inferiority of the phenolic hydroxyl group to force ring closure. Quite unexpectedly the phenols as compared to the triamines are more energetic silver halide reducers. On the other hand they suffer somewhat by comparison with the triamines in so far as speed of coupling with the color formers is concerned. All told, however, they are satisfactory azine dye color developers, and the discovery of their use in this connection serves to broaden the possible selection of color developers for the azine synthesis. Furthermore, because of the energy at which they reduce silver halides, they may be employed efficaciously as black and white developers. Such compounds, moreover, are novel compounds.

Such compounds and their use as black and white developers and as color forming developers for the production of azine dye images constitute the purposes and objects of the present invention.

The color developers, the use of which is contemplated herein, are represented by the following structural formula:

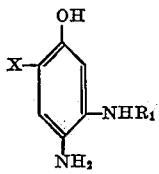

wherein $R_1$ is an aliphatic radical, such as alkyl, i. e., methyl, ethyl, propyl, butyl, amyl, and the like, hydroxyalkyl, such as hydroxyethyl, hydroxymethyl, hydroxypropyl, and the like, carboxyalkyl, such as carboxymethyl, carboxyethyl, carboxybutyl, and the like, sulfoalkyl, such as sulfomethyl, sulfoethyl, sulfopropyl, and the like, or an aromatic radical such as aryl, i. e., phenyl, tolyl, and the like, alkoxyaryl, such as methoxyphenyl, ethoxyphenyl, propoxyphenyl, and the like, carboxyaryl, such as carboxyphenyl, and the like, carboxyalkylaryl, such as carboxymethylphenyl, carboxyethylphenyl, and the like, carboxyalkoxyaryl, such as carboxymethoxyphenyl, carboxyethoxyphenyl, and the like; hydroxyalkylaryl, such as hydroxymethylphenyl, $\beta$-hydroxyethylphenyl, and the like, and X is sulfo or carboxy.

Examples of such developers which I have found to be suitable are:

1.

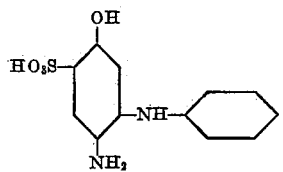

4-phenylamino-6-hydroxy-metanilic acid.

2.

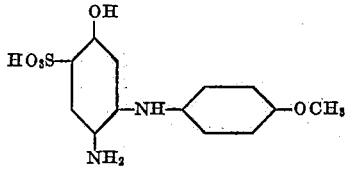

4-(4'-methoxyphenylamino)-6-hydroxy-metanilic acid.

3.

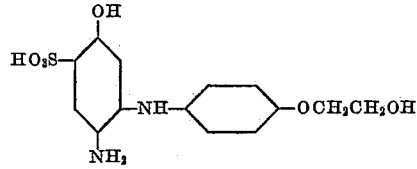

4-(4'-hydroxyethoxyphenylamino)-6-hydroxy-metanilic acid.

4.

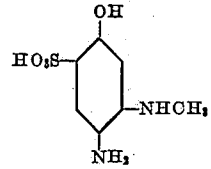

4-methylamino-6-hydroxy-metanilic acid.

5.

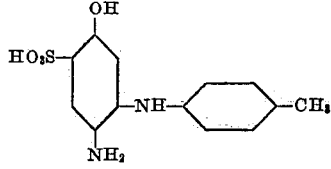

4-(4'-methylphenylamino)-6-hydroxy-metanilic acid.

6. 4-β-hydroxyethylamino-6-hydroxy-metanilic acid.

7. 4-ethylamino-6-hydroxy-metanilic acid.

8.

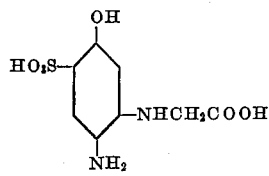

4-carboxymethylamino-6-hydroxy-metanilic acid.

9. 4-carboxyethylamino-6-hydroxy-metanilic acid.

10.

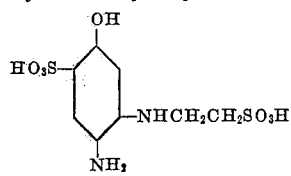

4-β-sulfoethylamino-6-hydroxy-metanilic acid.

11.

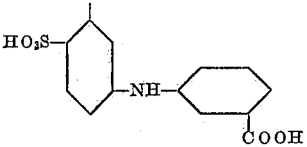

4-(3'-carboxyphenylamino)-6-hydroxy-metanilic acid.

12.

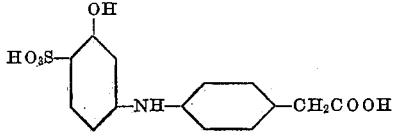

4-(4'-carboxymethylphenylamino)-6-hydroxy-metanilic acid.

13.

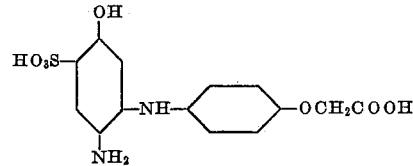

4-(4'-carboxymethoxyphenylamino)-6-hydroxy-metanilic acid.

14.

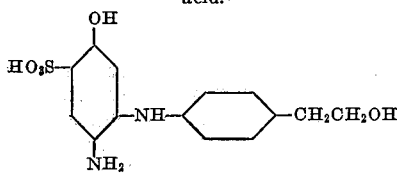

4-(4'-β-hydroxyethylphenylamino)-6-hydroxy metanilic acid.

15.

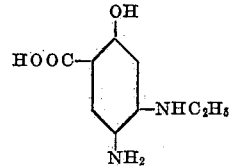

4-methylamino-6-hydroxy-benzaminic acid.

16. 4-phenylamino-6-hydroxy-benzaminic acid.

17. 4-(4'-hydroxyethoxyphenylamino) - 6 - hydroxy - benzaminic acid.

18. 4-(3'-methoxyphenylamino)-6-hydroxybenzaminic acid.

19. 4-(β-hydroxyethylamino)-6-hydroxybenzaminic acid.

20. 4-carboxymethylamino-6-hydroxybenzaminic acid.

21. 4-(4'-methylphenylamino)-6-hydroxybenzaminic acid.

22. 4-β-sulfoethylamino-6-hydroxybenzaminic acid.

23. 4-(4'-hydroxyphenylamino)-6-hydroxybenzaminic acid.

24. 4 - (4' - carboxymethylphenylamino) - 6 - hydroxybenzaminic acid.

25. 4-(4'-carboxymethoxyphenylamino) - 6 - hydroxybenzaminic acid.

The above compounds are prepared by utilizing as the parent material 2,4-dichloro-5-nitrobenzene sulfonic acid or carboxylic acid and an amine, the radical of which it is desired should appear in the 4-position of the resulting compound. The preparation is made possible by virtue of the fact that in the noted sulfonic or carboxylic acids, the chlorine atom in 4-position is more reactive than that in the 2-position and hence may be selectively replaced by any desired amine by heating the reactants preferably to reflux in the presence of an alkali.

The chlorine atom in 2-position of the intermediate so formed is then readily replaced by an hydroxyl group by heating the intermediate with an alkali metal hydroxide, for example, potassium hydroxide, sodium hydroxide, and the like.

The nitro group in the 5-position may then be reduced to the amino group by any conventional reduction method, such as by use of an alkaline solution of sodium hydrosulfite.

The procedure for preparing such compounds is specifically illustrated as follows in connection with 4-phenylamino-6-hydroxy-metanilic acid.

(a) *Preparation of 2-chloro-4-(phenylamino)-5-nitrobenzene sulfonic acid*

In a 1-liter, 3-necked, round bottom flask equipped with a mechanical stirrer and reflux condenser was placed 147 g. (0.5 mole) of 2,4-dichloro-5-nitrobenzene sulfonic acid, sodium salt, 47.5 g. (0.51 mole) of aniline and 32.2 g. (0.26 mole) of sodium carbonate monohydrate dissolved in 250 cc. of water. The stirrer was started and the contents of the flask were heated to gentle reflux for sixteen hours. Ten grams of Norite (carbon black) were added to the hot, clear solution and the mixture stirred with heating for another half hour. The carbon was removed by filtration and the filtrate chilled in an ice bath. The precipitated yellow-orange solid was collected on a Büchner funnel, washed with cold water and dried overnight at 80–90° C. The weight of the yellow solid was 165 g. (94 percent). The crude product was recrystallized from water for use in step (b).

(b) *Preparation of 2-hydroxy-4-(phenylamino)-5-nitrobenzene sulfonic acid*

Into a 1-liter, 3-necked, round bottom flask equipped with a mechanical stirrer and a reflux condenser were charged 110 g. (0.3 mole) of the potassium salt of 2-chloro-4-(phenylamino)-5-nitrobenzene sulfonic acid, and 67.2 g. (1.2 moles) of potassium hydroxide dissolved in 400 cc. of $H_2O$. The mixture was heated under gentle reflux with stirring for twenty-two hours. The clear, dark red solution was chilled in an ice bath. The precipitated product was collected on a Büchner funnel, washed with 100 cc. of ice water and dried at 75–80° C. The weight of the orange crystalline product is 53.5 g. (46.2 percent).

(c) *Preparation of 4-(phenylamino)-6-hydroxy metanilic acid*

13 grams of the potassium salt of 2-hydroxy-4-(phenylamino)-5-nitrobenzene sulfonic acid were suspended in 100 cc. of water and the mixture heated to 65° C. with mechanical stirring. 30 cc. of 36 percent sodium hydroxide solution and 25 g. of sodium hydrosulfite were added portionwise to the hot solution. Reduction was rapid and the solution became a clear, light yellow color. The hot solution was acidified to pH 6 with dilute hydrochloric acid solution (1:1) whereupon a thick precipitate formed. After chilling in an ice bath, the product was collected on a Büchner, washed first with 300 cc. of water and finally with 100 cc. of methanol, and dried on a steam cone. Weight of light pink solid, 7 g. (71.8 percent).

The above color developers may be utilized with appropriate color formers to produce any of the subtractively colored azine dye images, to wit, yellow, magenta and cyan.

Color formers to be used to give the yellow azine dye images are described in my copending application Serial No. 101,913, filed July 28, 1949, and entitled "Color Developers for the Production of Azine Dye Images."

Examples of such compounds are:

Acetoacetanilide.
N-1-naphthylacetoacetamide.
N,N'-ethylenebisacetoacetamide.
p,p'-Bi-o-acetoacetaniside
N-2-naphthylbenzoylacetamide.
p,p'-Biacetoacetanilide
$a,a'$-Terephthaloylbis-(3-chloro-4,6 - dimethoxyacetanilide).
$a$-Benzoylacetanilide.

Preferably the color formers utilized contain a group rendering them non-migratory in the emulsion. Examples of such compounds are:

2-(m - benzoylacetamidophenyl) - 1 - octadecyl-5-benzimidazolesulfonic acid.
3,3'-ureylenebis - 5 - p - benzoylacetamidobenzamide-benzene sulfonic acid.
2 - p - benzoylacetamidobenzamido - 6 - stearoylamino-p-toluenesulfonic acid.
2 - (p - benzoylacetamidophenyl) - 1 - octadecyl-5-benzimidazolesulfonic acid.
p-cyanoacetyl-3-octadecenylsuccinalic acid.

Color formers capable of producing magenta dyestuff images are also described in my above entitled application as well as in application Serial No. 793,533, filed December 23, 1947, by Tulagin and Coles and entitled "Magenta Colored Phenazonium Dyestuff Images," now Patent No. 2,524,741. Preferably these color formers are: 6-halogen-8-hydroxy quinolines, and particularly those which are non-migratory in the emulsions. Examples of the latter type compounds are:

6 - stearoylamino-2-(2'-phenyl-6'-bromo-8'-hydroxy cinchoninoyl)-amino toluene-4-sulfonic acid
2-phenyl-6-chloro-8-hydroxy cinchoninoyl octadecyl taurine
6-decoxy-3-(2-phenyl - 6 - bromo - 8 - hydroxycinchoninoyl)-aminobenzene sulfonic acid.
2-(3 - stearoylaminophenyl)-6-bromo-8-hydroxy cinchoninic acid
2 - stearoylamino - 6 - (6 - chloro - 8 - hydroxycinchoninoyl) - aminotoluene-4-sulfonic acid, and the like.

Color formers for the cyan image are also described in my application Serial No. 101,913 and in U. S. P. 2,445,252, granted July 13, 1948, to Tulagin. Preferably these color formers are aryl-J-acid derivatives, particularly those containing a group rendering the color former non-migratory in the emulsion. Examples of the latter compounds are:

Dodecyl urethane of $\beta$-sulfoethyl-J-acid
Tetradecyl urethane of p-anisyl J-acid
2-hexadecyl urethane of phenyl-J-acid
4-stearoylaminophenyl-J-acid, and the like.

The process using the new color developers may be effected in various ways. For instance, the color forming component may be located in the color developer. On the other hand, the color former in non-diffusing form may be located in the emulsion. Multilayer film, each layer containing a non-diffusing color former may be employed and the entire film color developed to the desired subtractive dyestuff images in a single color forming development step using the developers previously referred to. To insure formation of the yellow azine dye image, however, the alkalinity of the emulsion should be adjusted in a final step as described in copending application of Donald E. Sargent and myself, Serial No. 66,825, filed December 22, 1948, and entitled "Production of Yellow Dye Images by Color Development," now Patent No. 2,522,802, September 19, 1950.

The color developers, in addition to containing the aforesaid phenolic developers, will also contain the usual adjuncts, such as alkali, i. e., sodium carbonate, a preservative, i. e., sodium sulfite, an accelerator, i. e., a heterocyclic nitrogenous base such as pyridine, quinoline and the like, and a restrainer, i. e., potassium bromide, or the like.

It is believed that the role played by the color developers can be better understood from the following equation which it is believed illustrates the course of the reaction while employing as the color former acetoacetanilide and as the color developer 4-phenylamino-6-hydroxy-metanilic acid. It is to be understood, however, that this equation is merely theoretical and is being advanced solely for the purpose of providing a better understanding of the invention.

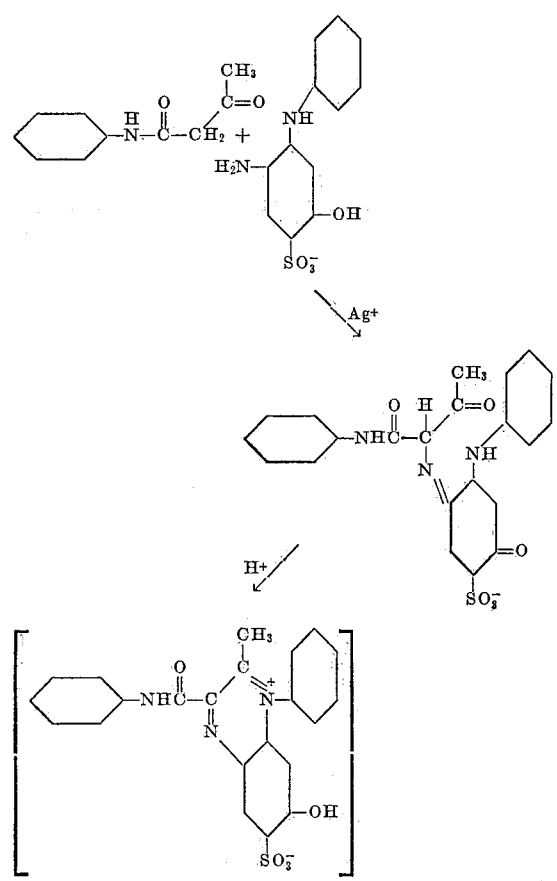

It will be appreciated that the use of the phenolic color developers in place of the triamine color developers of U. S. P. 2,486,440 yields azine dye images of different constitution. Thus, whereas the triamines yield azine dyes in which the position ortho to the sulfo group is substituted by an amino group, the phenolic color developers yield azine dyes in which the position ortho to the sulfo group is phenolic hydroxyl.

The invention is further illustrated by the following examples, but it is to be understood that the invention is not restricted thereto.

*Example I*

An azine dye-forming developer solution of the following composition was prepared:

| | |
|---|---|
| 4 - (phenylamino) - 6 - hydroxy metalinic acid _____ g__ | 6 |
| Sodium carbonate _____ g__ | 40 |
| Sodium sulfite _____ g__ | 40 |
| Potassium bromide _____ g__ | 2 |
| Pyridine _____ g__ | 15 |
| 8-hydroxy quinoline _____ g__ | 2 |
| Water _____ cc__ | 1000 |

A film which had been exposed, developed to a negative image in black and white developer and re-exposed, was treated in the above solution for 20 minutes. After bleaching and fixing, there was obtained a reversed magenta dye image.

*Example II*

The procedure is the same as in Example I excepting that the 4-(phenylamino) - 6 - hydroxy metanilic acid is replaced by 4 - (4' - methoxy phenylamino)-6-hydroxy metalinic acid.

*Example III*

A photographic silver halide emulsion containing a non-diffusing magenta color former, 2-stearylamino-6-(6-chloro-8-hydroxy-cinchoninyl amino)-toluene-4-sulfonic acid was exposed, a negative silver image developed in a black and white developer, re-exposed, and color developed for 18 minutes in the following solution:

| | |
|---|---|
| 4-(4'-hydroxyethoxyphenylamino) - 6 - hydroxy metalinic acid _____ g__ | 5 |
| Trisodium phosphate _____ g__ | 40 |
| Sodium sulfite _____ g__ | 60 |
| Potassium bromide _____ g__ | 5 |
| Hydroxylamine hydrochloride _____ g__ | 1 |
| Ethylene diamine _____ g__ | 10 |
| Water to _____ cc__ | 1000 |

After development, the film was bleached and fixed, thereby yielding a reversed magenta dye image.

*Example IV*

The procedure is the same as in Example III excepting that the 4-(4'-hydroxyethoxyphenylamino)-6-hydroxy metalinic acid is replaced by 4-methylamino-6-hydroxy metalinic acid.

*Example V*

A multilayer color film containing, in the red sensitive bottom layer a suitable non-diffusing cyan color former such as naphthyl-J-acid-N-octadecyl urethane, in the green sensitive middle layer a suitable non-diffusing magenta color former such as N-tetradecyl - N - (β-hydroxy-cinchoninyl) taurine, and in the blue sensitive top layer a suitable non-diffusing yellow color former, such as 2-(4-benzoylacetaminophenyl)-1-octadecyl-5-benzimidazole sulfonic acid, was exposed and developed to a negative silver image in a black and white developer. The film was re-exposed and color developed in the following bath for 20 minutes:

| | | |
|---|---|---|
| 4-(4'-methylphenylamino)-6-hydroxy metalinic acid | g | 8 |
| Sodium carbonate, monohydrate | g | 30 |
| Sodium sulfite | g | 40 |
| Potassium bromide | g | 1 |
| 2-aminopyridine | g | 16 |
| Water to | cc | 1000 |

After development, the film was washed, bleached, fixed in an acid-hardening hypo and finally bathed in a 3 percent sodium carbonate solution for 5 minutes. There was thus obtained a positive dye image in all three layers—yellow in top, magenta in middle, and cyan in bottom.

*Example VI*

The procedure is the same as in Example V excepting that the 4-(4'-methylphenylamino)-6-hydroxy metanilic acid is replaced by 4-(4'-methylphenylamino)-6-hydroxy-benzaminic acid. The results are substantially the same as those procured in Example V.

*Example VII*

The procedure is the same as in Example III, excepting that the 4-(4'-hydroxyethoxy phenylamino)-6-hydroxy metanilic acid is replaced by 4-phenylamino-6-hydroxy-benzaminic acid. A reversed magenta dye image was also obtained in this case.

It is to be understood that any of the color developers referred to in the examples may be replaced by an equivalent amount of the other color developers specifically illustrated above while obtaining the desired result.

I claim:

1. A photographic developer comprising an aqueous alkaline solution of an alkali metal sulfite and a compound of the following formula:

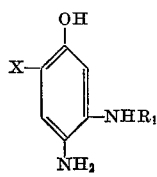

in which $R_1$ is selected from the class consisting of aliphatic and aromatic radicals, and X is selected from the class consisting of carboxylic and sulfonic acid radicals.

2. A photographic developer as defined in claim 1 containing a color forming component.

3. A photographic developer as defined in claim 1 containing a color forming component which is an open chain keto methylene compound.

4. The process of producing azine dyestuff images in an exposed silver halide emulsion which comprises developing said emulsion with a photographic developer containing as the active developing agent a compound of the following formula:

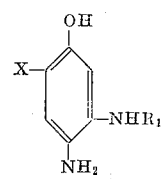

in which $R_1$ is selected from the class consisting of aliphatic and aromatic radicals, and X is selected from the class consisting of carboxylic and sulfonic acid radicals in the presence of a color forming component capable of reacting with the oxidation products of said active developing agent to produce a dye image.

5. The process as defined in claim 4 wherein the color forming component is located in the emulsion.

6. The process as defined in claim 4 wherein the color forming component is located in the developer.

7. The process as defined in claim 4 in which the color developer is 4-phenylamino-6-hydroxy metanilic acid.

8. The photographic developer for producing azine dye images on color development comprising an aqueous alkaline solution of an alkali metal sulfite and 4-phenylamino-6-hydroxy metanilic acid.

ROBERT C. GUNTHER.

No references cited.